(12) United States Patent
Lu et al.

(10) Patent No.: US 7,013,532 B2
(45) Date of Patent: Mar. 21, 2006

(54) HINGE

(75) Inventors: Sheng-Nan Lu, Shulin (TW); Hsiang-Chi Chien, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 139 days.

(21) Appl. No.: 10/697,008

(22) Filed: Oct. 31, 2003

(65) Prior Publication Data

US 2005/0091796 A1 May 5, 2005

(51) Int. Cl.
*E05C 17/64* (2006.01)

(52) U.S. Cl. .......................... 16/337; 16/345; 16/344; 16/334; 16/342

(58) Field of Classification Search ................ 16/337, 16/345, 344, 334, 374–376, 340, 342, 328–332; 455/575.3; 361/680–683; 248/917–921
See application file for complete search history.

(56) References Cited

U.S. PATENT DOCUMENTS

| | | | | |
|---|---|---|---|---|
| 1,180,669 A | * | 4/1916 | Oellrich et al. ................ | 296/92 |
| 2,736,027 A | * | 2/1956 | Parmelee ........................... | 2/8 |
| 6,081,969 A | * | 7/2000 | Tanahashi et al. ............ | 16/337 |
| 6,125,507 A | * | 10/2000 | Katoh ......................... | 16/329 |
| 6,170,120 B1 | * | 1/2001 | Lu .............................. | 16/342 |
| 6,321,416 B1 | * | 11/2001 | Lu .............................. | 16/374 |
| 6,845,546 B1 | * | 1/2005 | Lu et al. ....................... | 16/367 |
| 2004/0025299 A1 | * | 2/2004 | Higano et al. ................. | 16/342 |

\* cited by examiner

*Primary Examiner*—Robert J. Sandy
*Assistant Examiner*—Michael J. Kyle
(74) *Attorney, Agent, or Firm*—Fei-Fei Chao; Bingham McCutchen LLP

(57) ABSTRACT

A hinge includes a pintle in turn extending through a first sheet, a rotating ring, a second sheet, a positioning ring, an elastic ring, and a washer, and fastened by a collar at a distal end of the pintle. The hinge can be rotated clockwise and counterclockwise and positioned at the angles of 0 degrees, 90 degrees, 180 degrees, −90 degrees, and −180 degrees.

4 Claims, 5 Drawing Sheets

HINGE

BACKGROUND OF THE INVENTION

1. Field of the Invention

The present invention relates to a hinge, and more particularly to a hinge which can be rotated clockwise and counterclockwise, and positioned at some specific angles.

2. Description of Related Art

Some mobile phones have a monitor mounted on a body by a hinge between the body and the monitor. The conventional hinge installed in the mobile phones has a rotary axis perpendicular to the monitor and the body. When the body is overlapped with the monitor, the mobile phone is in a status of being switched-off or hung-up; when the monitor is rotated transversally to reveal the body, a user can operate the keys on the body to receive or dial up a call.

However, by using the conventional hinge, the monitor only can be positioned at an overlapped position (an included angle of 0 degrees) and an opposed position (an included angle of 180 degrees) about the body. Thus, the monitor rotates too freely about the body in use, and the user cannot use the mobile phone in positions of the monitor about the body other than the two limits.

Therefore, the invention provides a hinge to mitigate or obviate the aforementioned problems.

SUMMARY OF THE INVENTION

The main objective of the present invention is to provide a hinge which can be rotated clockwise and counterclockwise and positioned at some specific angles.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
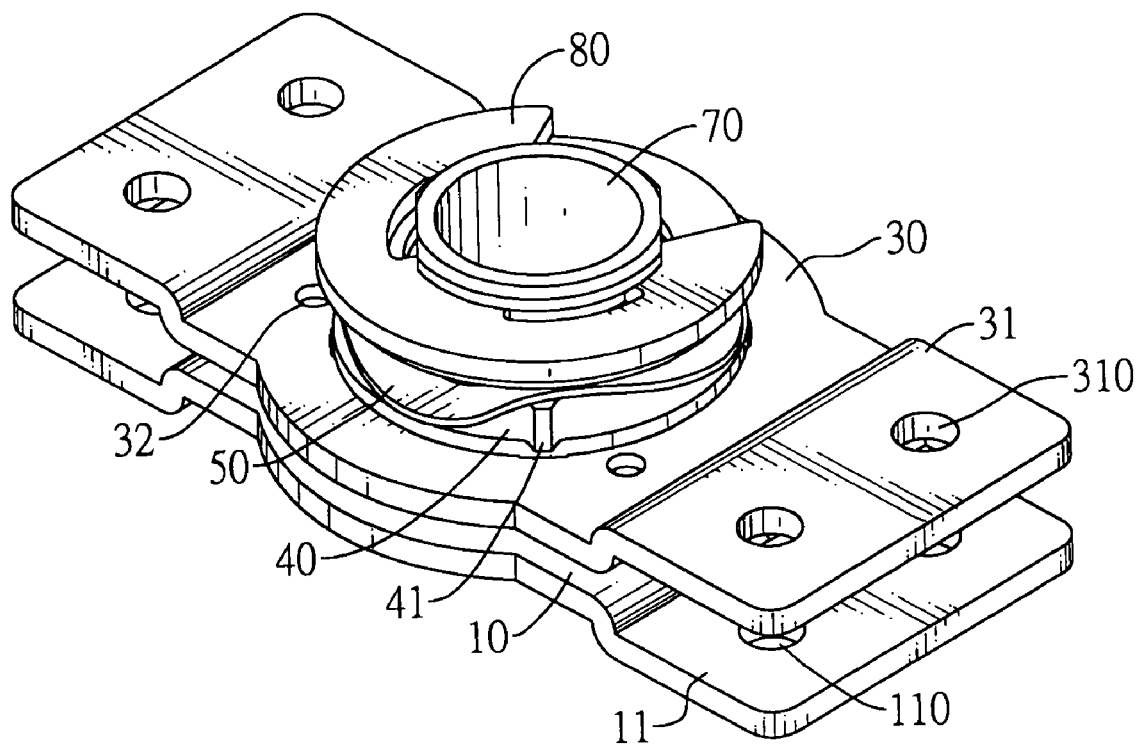
FIG. 1 is a perspective view of a hinge in accordance with the invention.
Figure 2:
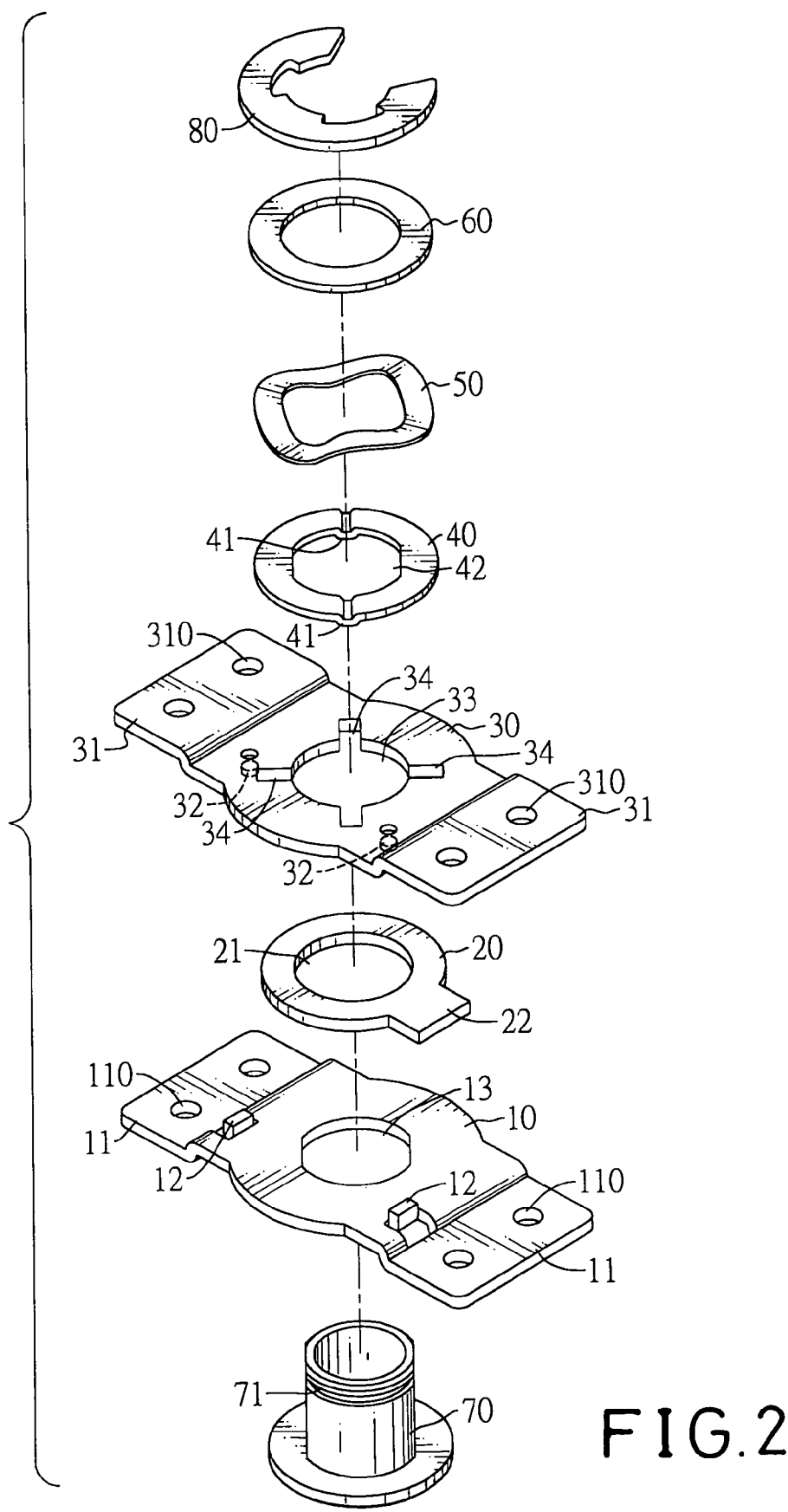
FIG. 2 is an exploded perspective view of the hinge in FIG. 1.
Figure 3:
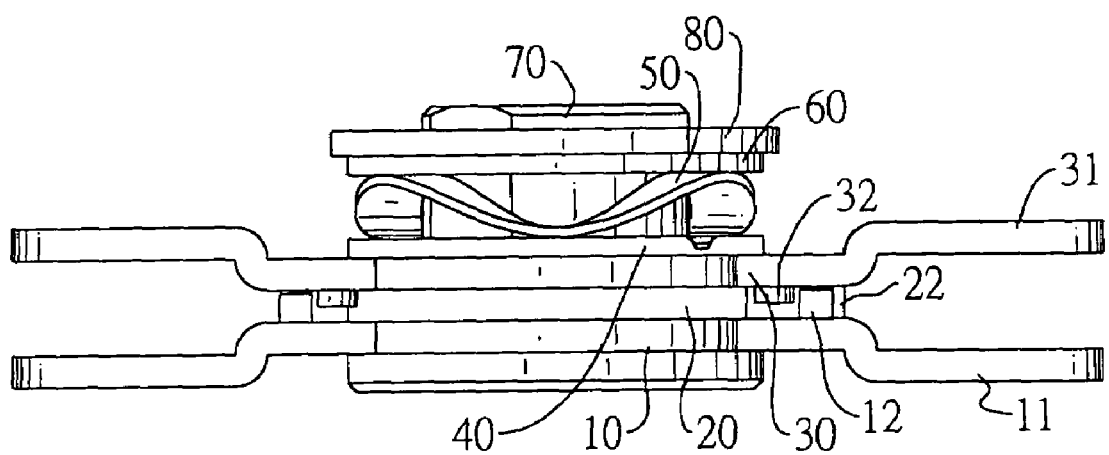
FIG. 3 is a front view of the hinge in FIG. 1.

With reference to FIGS. 1–3, a hinge in accordance with the present invention is composed of a first sheet (10), a rotating ring (20), a second sheet (30), a positioning ring (40), an elastic ring (50), a washer (60), a pintle (70) and a collar (80).

The first sheet (10) has a first opening (13) defined at a center thereof. The first opening (13) has a cross section with two parallel linear sides (not numbered) and two arcuate sides (not numbered) respectively between the parallel linear sides. Two first wings (11) are formed at two diametrically opposite sides of the first opening (13), and each have at least one (two in this embodiment) first hole (110) defined therethrough. Two first lugs (12) are formed on an upper surface of the first sheet (10) and respectively adjacent to the first wings (11).

The rotating ring (20) is mounted on the first sheet (10) and has a second opening (21) aligned with the first opening (13). An ear (22) is formed at an outer circumference of the rotating ring (20).

The second sheet (30) is mounted on the rotating ring (20) and has a third opening (33) defined therethrough and aligned with the first and second openings (13, 21). Four slots (34) are radially and evenly defined around an outer circumference of the third opening (33) and in communication with the third opening (33), e.g. each two adjacent slots (34) with an included angle of 90 degrees, and each two opposed slots (34) with an included angle of 180 degrees. In this embodiment, the four slots (34) are respectively located at upper-left, lower-left, upper-right and lower-left positions of the second sheet (30). Two second wings (31) are formed at two diametrically opposite sides of the third opening (33), and each has at least one (two in this embodiment) second hole (310) defined therethrough. Two second lugs (32) are formed at a lower surface of the second sheet (30).

The positioning ring (40) is mounted on the second sheet (31) and has a fourth opening (42) defined therethrough and aligned with the third opening (33). The fourth opening (42) has a cross section with two parallel linear sides and two arcuate sides between the linear sides and corresponding to the first opening (13). At least one protrusion (41) is formed at a lower surface of the positioning ring (40) and selectively positioned in one of the slots (34). In this embodiment, two protrusions (41) are provided at two diametrically opposite sides of the fourth opening (42).

The elastic ring (50) is provided on the positioning ring (40), and the washer (60) is mounted on the elastic ring (50).

The pintle (70) has a cross section corresponding to the first opening (13) and the fourth opening (42), and in turn extends through the first opening (13) of the first sheet (10), the second opening (21) of the rotating ring (20), the third opening (33) of the second sheet (30), the fourth opening (42) of the positioning ring (40), the elastic ring (50) and the washer (60). The pintle (70) further has an annular recess (71) defined at a distal end thereof.

The C-shaped collar (80) is attached in the annular recess (71) to fasten the pintle (70) in the elements described above.

Figure 4A:
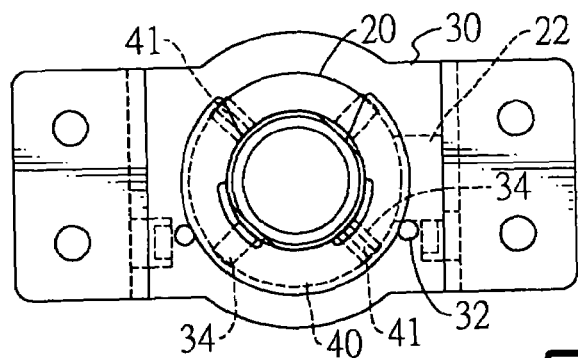
FIGS. 4A–C are schematic views of the hinge being rotated counterclockwise.

With reference to FIG. 4A, the ear (22) of the rotating ring (20) is at the right side in the figure, the right second lug (32) is beneath the ear (22), and the protrusions (41) are located respectively in two corresponding slots (34) (the upper-left and lower-right). In this situation, when the second sheet (30) is turned counterclockwise, the rotating ring (20) is pushed by the right second lug (32) to turn counterclockwise along with the second sheet (30). (When the second sheet (30) is turned clockwise, the rotating ring (20) will not be pushed by the second lug (32) and will not be rotated, so this status will not be shown or described in detail).

Figure 4B:
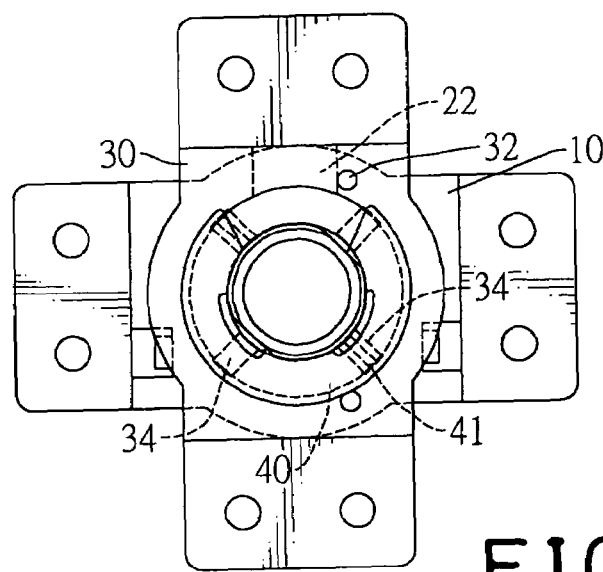

With reference to FIG. 4B, when the second sheet (30) is rotated 90 degrees from an original position, the protrusions (41) are respectively located in the other slots (34) (the lower-left and the upper-right) to position the second sheet (30).

Figure 4C:
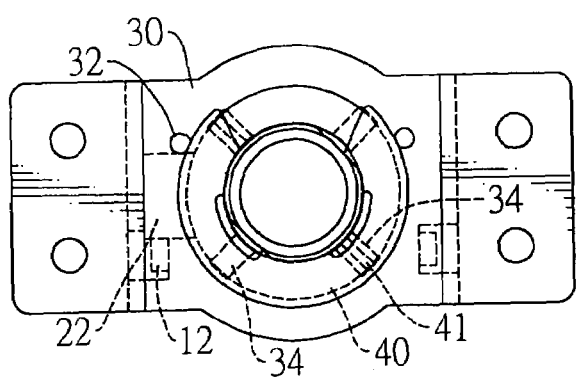

With reference to FIG. 4C, when the second sheet (30) is rotated 180 degrees from an original position, the ear (22) of the rotating ring (20) is at the left side in the figure, and is blocked by the left first lug (12), so the second sheet (30) cannot be rotated further counterclockwise. At the same time, the protrusions (41) are located in the corresponding slots (34) (the upper-right and lower-left) to position the second sheet (30).

Figure 5A:
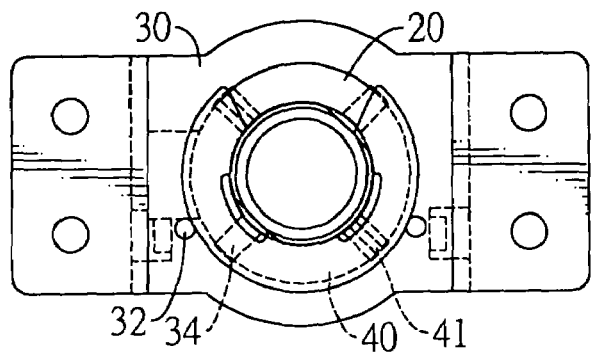
FIGS. 5A–C are schematic views of the hinge being rotated clockwise.

With reference to FIG. 5A, the ear (22) of the rotating ring (20) is at the left side in the figure, the left second lug (32) is beneath the ear (22), and the protrusions (41) are located respectively in two corresponding slots (34) (the upper-left and lower-right). In this situation, when the second sheet (30) is turned clockwise, the rotating ring (20) is pushed by the left second lug (32) to turn clockwise along with the second sheet (30). (When the second sheet (30) is turned counterclockwise, the rotating ring (20) will not be pushed by the second lug (32) and will not be rotated, so this status will not be shown or described in detail).

Figure 5B:
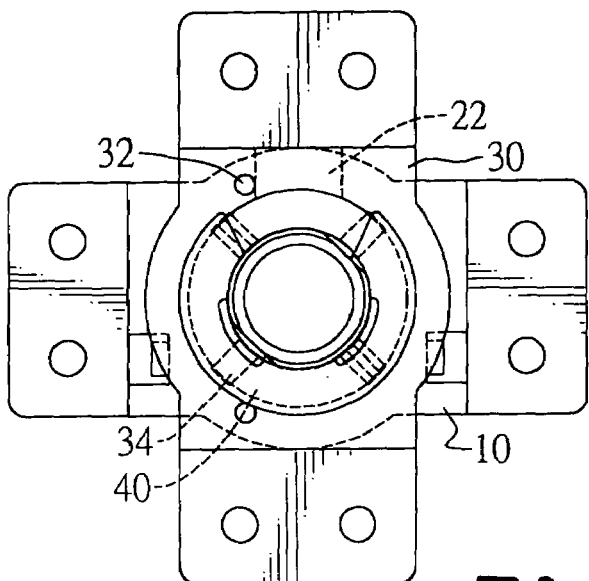

With reference to FIG. 5B, when the second sheet (30) is rotated 90 degrees, the protrusions (41) are located respectively in the other slots (34) (the lower-left and the upper-right) to position the second sheet (30).

Figure 5C:
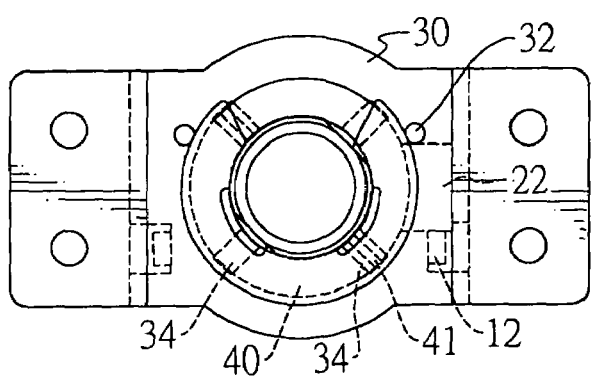

With reference to FIG. 5C, when the second sheet (30) is rotated 180 degrees, the ear (22) of the rotating ring (20) is at the right side in the figure, and is blocked by the right first lug (12), so the second sheet (30) cannot be rotated further clockwise. At the same time, the protrusions (41) are located in the corresponding slots (34) (the upper-right and lower-left) to position the second sheet (30).

Therefore, according to the invention, the hinge can be rotated clockwise and counterclockwise and positioned at angles of 0 degrees, 90 degrees, 180 degrees, −90 degrees, and −180 degrees.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge comprising:
    a first sheet having a non-circular first opening, two first wings formed at two diametrically opposite sides of the non-circular first opening and each having at least one first hole defined through the first wing, and two first lugs formed on an upper surface of the first sheet and respectively adjacent to the first wings;
    a rotating ring mounted on the first sheet, the rotating ring having a second opening aligned with the first opening, and an ear formed at an outer circumference of the rotating ring;
    a second sheet mounted on the rotating ring, the second sheet having a third opening aligned with the first and second openings, four slots radially and evenly defined around an outer circumference of the third opening and in communication with the third opening, two second wings formed at two diametrically opposite sides of the third opening and each having at least one second hole defined through the second wing and two second lugs formed at a lower surface of the second sheet;
    a positioning ring mounted on the second sheet, the positioning ring having a non-circular fourth opening aligned with the third opening and corresponding to the first opening, at least one protrusion formed at a lower surface of the positioning ring and selectively positioned in one of the slots;
    an elastic ring provided on the positioning ring;
    a washer mounted on the elastic ring;
    a pintle with a non-circular cross section corresponding to the first opening and the fourth opening, in turn extending through the first opening of the first sheet, the second opening of the rotating ring, the third opening of the second sheet, the fourth opening of the positioning ring, the elastic ring, and the washer, the pintle having an annular recess defined at a distal end of the pintle; and
    a C-shaped collar attached in the annular recess to fasten the pintle.

2. The hinge as claimed in claim 1, wherein the first opening has a cross section with two parallel linear sides and two arcuate sides respectively between ends of the parallel linear sides.

3. The hinge as claimed in claim 2, wherein the fourth opening has a cross section with two parallel linear sides and two arcuate sides respectively between ends of the parallel linear sides and corresponding to the first opening.

4. The hinge as claimed in claim 3, wherein the pintle has a cross section with two parallel linear sides and two arcuate sides respectively between ends of the parallel linear sides and corresponding to the first and fourth openings.

* * * * *